United States Patent
Tanaka

(10) Patent No.: US 8,995,011 B2
(45) Date of Patent: Mar. 31, 2015

(54) CALIBRATION PERFORMED IN IMAGE FORMATION APPARATUS TO MAINTAIN IMAGE QUALITY

(75) Inventor: Sumito Tanaka, Tokyo (JP)

(73) Assignee: Canon Kabushiki Kaisha (JP)

( * ) Notice: Subject to any disclaimer, the term of this patent is extended or adjusted under 35 U.S.C. 154(b) by 388 days.

(21) Appl. No.: 12/879,373

(22) Filed: Sep. 10, 2010

(65) Prior Publication Data

US 2011/0063640 A1 Mar. 17, 2011

(30) Foreign Application Priority Data

Sep. 17, 2009 (JP) .................................. 2009-216168

(51) Int. Cl.
 *H04N 1/60* (2006.01)
 *G06K 1/00* (2006.01)
(52) U.S. Cl.
 CPC ........... *H04N 1/6033* (2013.01); *H04N 1/6097* (2013.01)
 USPC .......... 358/1.9; 358/518; 358/1.13; 358/1.15; 358/1.2; 347/19; 347/14; 347/16; 347/100; 399/45
(58) Field of Classification Search
 USPC ..................... 358/1.9; 347/19, 14, 16; 399/45
 See application file for complete search history.

(56) References Cited

U.S. PATENT DOCUMENTS

| 6,034,788 A | 3/2000 | Sasanuma et al. |
| 2004/0113963 A1* | 6/2004 | Tsujimoto ....................... 347/14 |
| 2005/0088710 A1 | 4/2005 | Nakayama |
| 2005/0117927 A1 | 6/2005 | Tanaka et al. |
| 2005/0129307 A1 | 6/2005 | Hasegawa |
| 2005/0219305 A1* | 10/2005 | Kikuchi et al. ................. 347/19 |

FOREIGN PATENT DOCUMENTS

| CN | 1630336 A | 6/2005 |
| CN | 200410074238 A | 6/2005 |
| JP | 7-261479 A | 10/1995 |
| JP | 8-287217 A | 11/1996 |
| JP | 2004-122766 A | 4/2004 |
| JP | 2008-287017 A | 11/2008 |
| KR | 10-2005-0053308 A | 6/2005 |
| WO | 2007/107374 A1 | 9/2007 |

OTHER PUBLICATIONS

Search Report issued in corresponding European patent application No. 10175781.3, issued Sep. 28, 2011.
Korean OA issued Feb. 28, 2013 for corresponding KR 10-2010-0090978.
Chinese Office Action for corresponding CN 201010287759. Mail date Feb. 17, 2013.
Japanese Office Action issued in Japanese counterpart application No. JP2009-216168, dated May 17, 2013.

* cited by examiner

*Primary Examiner* — Quang N Vo
(74) *Attorney, Agent, or Firm* — Rossi, Kimms & McDowell LLP

(57) ABSTRACT

An image formation apparatus performs calibration to maintain image quality. An adding unit performs addition processing to add an arbitrary type of printing medium different from a printing medium designated in advance as a printing medium usable for the calibration. A storage unit stores characteristic information indicating characteristics of each of a plurality of arbitrary types of printing media added by the adding unit. A determination unit determines an arbitrary type of printing medium relatively approximate to the characteristics of the printing medium designated in advance by comparing the characteristic information of each of the plurality of arbitrary types of printing media with the characteristics of the printing medium designated in advance. A calibration performing unit performs the calibration using the printing medium determined by the determination unit.

14 Claims, 16 Drawing Sheets

|  | PRINTING MEDIUM Z1 | PRINTING MEDIUM Z2 |
|---|---|---|
| MEDIA TYPE | PLAIN PAPER | COATED PAPER |
| GRAMMAGE | 60g | 115g |
| GLOSS LEVEL | 6 | 13 |
| WHITENESS LEVEL | 90 | 80 |

FIG. 14

| PARAMETER | | COEFFICIENT |
|---|---|---|
| MEDIA TYPE | DESIGNATED PRINTING MEDIUM | 1 |
| | PLAIN PAPER | 1 |
| | COATED PAPER | 1.5 |
| | MAT COATED PAPER | 1.2 |
| | RECYCLED PAPER | 0.6 |
| | HIGH GLOSSY PAPER | 1.5 |
| | MEDIUM GLOSSY PAPER | 1.3 |
| | LOW GLOSSY PAPER | 1.1 |
| GRAMMAGE | ~ 64g | 0.5 |
| | 64g ~ 80g | 0.8 |
| | 80g ~ 105g | 1 |
| | 105g ~ 250g | 1.4 |
| | 250g ~ 300g | 1.8 |
| | 300g ~ | 2 |
| GLOSS LEVEL | ~ 5 | 0.9 |
| | 5 ~ 7 | 1 |
| | 7 ~ 10 | 1.1 |
| | 10 ~ 15 | 1.3 |
| | 15 ~ 25 | 1.5 |
| | 25 ~ 45 | 1.8 |
| | 45 ~ | 2 |
| WHITENESS LEVEL | 60 | 0.6 |
| | 70 | 0.8 |
| | 80 | 1 |
| | 90 | 1.2 |
| | 99 | 1.4 |

F I G. 15

| | PRINTING MEDIUM Z1 | COEFFICIENT OF PRINTING MEDIUM Z1 | DIFFERENCE |
|---|---|---|---|
| MEDIA TYPE | PLAIN PAPER | 1 | 0 |
| GRAMMAGE | 60g | 0.7 | 0.3 |
| GLOSS LEVEL | 6 | 1 | 0 |
| WHITENESS LEVEL | 90 | 1.2 | 0.2 |
| MEDIA APPROXIMATE VALUE | | | 0.5 |

| | PRINTING MEDIUM Z2 | COEFFICIENT OF PRINTING MEDIUM Z2 | DIFFERENCE |
|---|---|---|---|
| MEDIA TYPE | COATED PAPER | 1.3 | 0.3 |
| GRAMMAGE | 115g | 1.4 | 0.4 |
| GLOSS LEVEL | 13 | 1.3 | 0.3 |
| WHITENESS LEVEL | 80 | 1 | 0 |
| MEDIA APPROXIMATE VALUE | | | 1 |

FIG. 17

| PARAMETER | | COEFFICIENT |
|---|---|---|
| MEDIA TYPE | DESIGNATED PRINTING MEDIUM | 1 |
| | PLAIN PAPER | 1 |
| | COATED PAPER | 1.3 |
| | MAT COATED PAPER | 1.2 |
| | RECYCLED PAPER | 0.6 |
| | HIGH GLOSSY PAPER | 1.5 |
| | MEDIUM GLOSSY PAPER | 1.3 |
| | LOW GLOSSY PAPER | 1.1 |
| GRAMMAGE | ~ 64g | 0.7 |
| | 64g ~ 80g | 0.8 |
| | 80g ~ 105g | 1 |
| | 105g ~ 250g | 1.4 |
| | 250g ~ 300g | 1.8 |
| | 300g ~ | 2 |
| GLOSS LEVEL | ~ 5 | 0.9 |
| | 5 ~ 7 | 1 |
| | 7 ~ 10 | 1.1 |
| | 10 ~ 15 | 1.3 |
| | 15 ~ 25 | 1.5 |
| | 25 ~ 45 | 1.8 |
| | 45 ~ | 2 |
| WHITENESS LEVEL | 60 | 0.6 |
| | 70 | 0.8 |
| | 80 | 1 |
| | 90 | 1.2 |
| | 99 | 1.4 |
| CREATION ORDER | 1 | 1 |
| | 2 | 1.1 |
| | 3 | 1.2 |
| | 4 | 1.3 |

FIG. 18

|  | Z1 | APPROXIMATE VALUE OF Z1 | DIFFERENCE |
|---|---|---|---|
| MEDIA TYPE | PLAIN PAPER | 1 | 0 |
| GRAMMAGE | 60g | 0.7 | 0.3 |
| GLOSS LEVEL | 6 | 1 | 0 |
| WHITENESS LEVEL | 90 | 1.2 | 0.2 |
| CREATION ORDER | 2 | 1.1 | 0.1 |
| MEDIA APPROXIMATE VALUE | | | 0.6 |

|  | Z2 | APPROXIMATE VALUE OF Z2 | DIFFERENCE |
|---|---|---|---|
| MEDIA TYPE | COATED PAPER | 1.3 | 0.3 |
| GRAMMAGE | 115g | 1.4 | 0.4 |
| GLOSS LEVEL | 13 | 1.3 | 0.3 |
| WHITENESS LEVEL | 80 | 1 | 0 |
| CREATION ORDER | 1 | 1 | 0 |
| MEDIA APPROXIMATE VALUE | | 2.37 | 1 | ably # CALIBRATION PERFORMED IN IMAGE FORMATION APPARATUS TO MAINTAIN IMAGE QUALITY

BACKGROUND OF THE INVENTION

1. Field of the Invention

The present invention relates to calibration for maintaining image quality.

2. Description of the Related Art

Image quality of an image formation apparatus varies depending on its use environment or use condition. Image quality also varies depending on the type of printing medium to be used. It is therefore necessary to change the image conversion conditions or image forming conditions depending on the environment or use condition (Japanese Patent Laid-Open No. 07-261479). It is also necessary to change the image conversion conditions or image forming conditions depending on the type of printing medium to be used (Japanese Patent Laid-Open No. 08-287217).

Japanese Patent Laid-Open No. 07-261479 assumes using a specific type of printing medium for calibration each time. For this reason, if the specific type of printing medium runs out, calibration cannot be performed. In Japanese Patent Laid-Open No. 08-287217 as well, to do calibration using an added arbitrary type of printing medium, a printing medium of the same type needs to be prepared each time. This is because the calibration is performed to maintain the gradation characteristic for the added arbitrary type of printing medium. If a printing medium of a type different from the designated type is used for calibration, for example, the amount of applied toner may be insufficient or exceed the permissible range designed for the image formation apparatus. This means that image quality cannot be maintained. It would be convenient for the operator if calibration for a desired printing medium can be performed using another type of printing medium. For example, to do calibration for maintaining the gradation characteristic for OHT (Overhead Transparency) sheets, using OHT sheets is designated. However, making plain paper usable for calibration to maintain the gradation characteristic for OHT sheets brings about significant advantages to the operator. The present invention proposes to register another type of printing medium in an image formation apparatus so that the other type of printing medium is usable in calibration to maintain image quality such as a gradation characteristic for a specific type of printing medium.

When a plurality of arbitrary types of printing media are registered for calibration, the calibration accuracy may change between these printing media. Especially, the calibration accuracy readily lowers when the other type of printing medium registered for calibration has characteristics largely different from those of a specific type of printing medium designated by the manufacturer in advance.

SUMMARY OF THE INVENTION

The present invention therefore has, as its feature, to make it possible to preferentially use a printing medium of high calibration accuracy when a plurality of arbitrary types of printing media that are different from a specific type of printing medium designated in advance are registered for calibration.

The present invention is realized, for example, on an image formation apparatus performing calibration to maintain image quality. The image formation apparatus may comprise the following unit. An adding unit performs addition processing to add an arbitrary type of printing medium different from a printing medium designated in advance as a printing medium usable for the calibration. A storage unit stores characteristic information indicating characteristics of each of a plurality of arbitrary types of printing media added by the adding unit. A determination unit determines an arbitrary type of printing medium relatively approximate to the characteristics of the printing medium designated in advance by comparing the characteristic information of each of the plurality of arbitrary types of printing media with the characteristics of the printing medium designated in advance. A calibration performing unit performs the calibration using the printing medium determined by the determination unit.

Further features of the present invention will become apparent from the following description of exemplary embodiments (with reference to the attached drawings).

BRIEF DESCRIPTION OF THE DRAWINGS

FIG. 14 is a view showing an example of a media characteristic table that registers the characteristic information of added printing media;

FIG. 15 is a table showing a computation example of media approximate values;

FIG. 17 is a view showing an example of a media characteristic table that registers the characteristic information of added printing media;

FIG. 18 is a table showing a computation example of media approximate values;

DESCRIPTION OF THE EMBODIMENTS

An embodiment of the present invention will be described below. Individual embodiments to be described below will serve to understand various concepts including the superordinate concept, intermediate concept, and subordinate concept of the present invention. The scope of the invention is determined by the claims which follow the description and is not limited to the individual embodiments to be described below.

[First Embodiment]

An embodiment applied to an electrophotographic color copying machine will be explained below. Note that the present invention is applicable to any image formation apparatus that needs calibration. The image formation scheme is not limited to electrophotography, and may be inkjet, electrostatic printing, and any other schemes. The present invention is applicable not only to an image formation apparatus for forming a multicolor image but also to an image formation apparatus for forming a monochrome image. The image formation apparatus may be commercially available as, for example, a printing apparatus, printer, copying machine, multifunction peripheral, or facsimile apparatus. The printing medium is also called printing paper, printing material, paper sheet, sheet, transfer material, or transfer paper. The printing medium can be made of paper, fiber, film, or resin.

<Basic Hardware Configuration>

Figure 1:
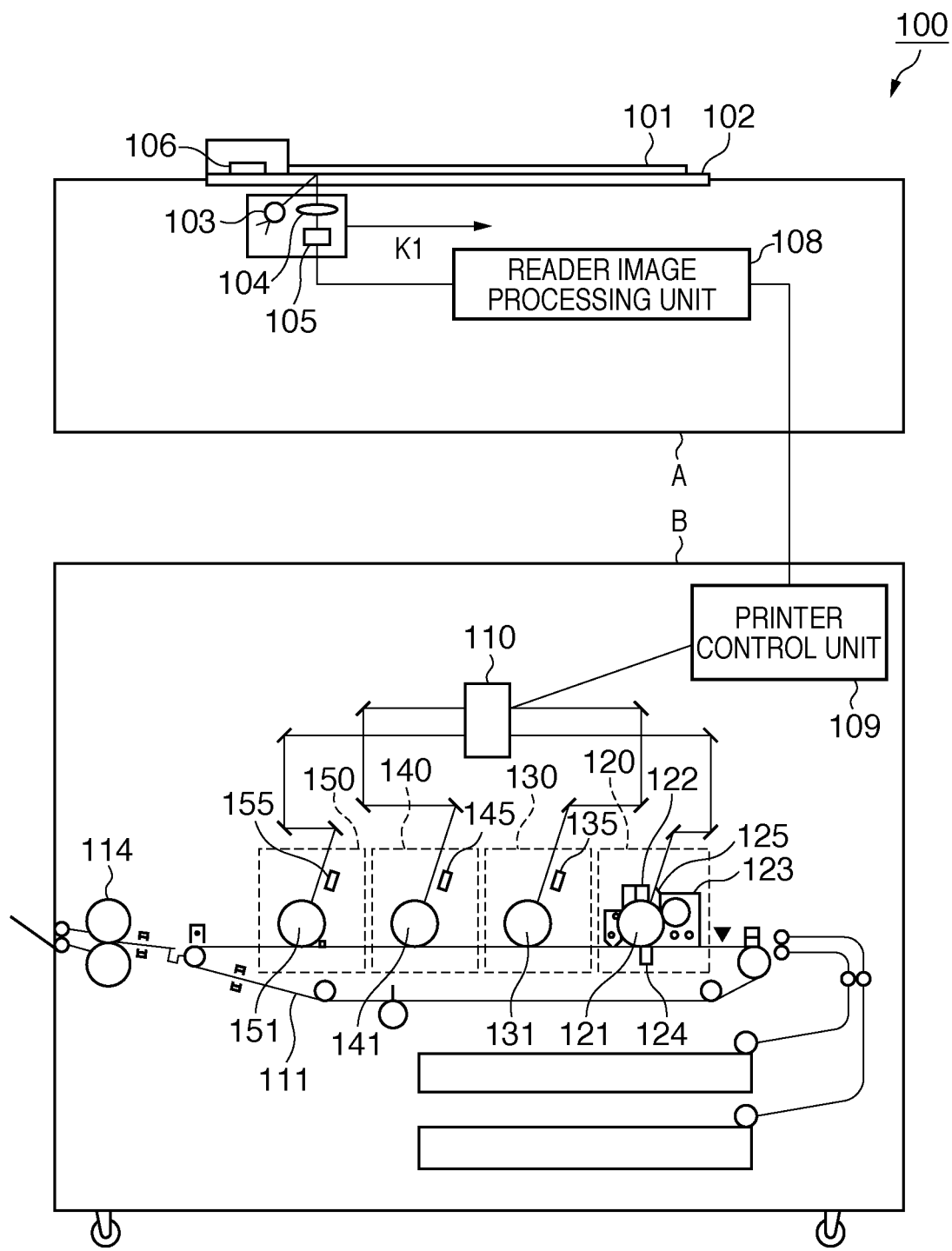
FIG. 1 is a view showing an arrangement example of a color copying machine.

A copying machine 100 shown in FIG. 1 includes a reader unit A which reads an image from an original document, and a printer unit B which forms the image obtained by reader unit A on a printing medium. The reader unit A reads a reference white board 106 before reading an original document 101 placed on an original platen glass 102 to perform so-called shading correction. The original document 101 is irradiated with light from a light source 103. The reflected light forms an image on a CCD sensor 105 via an optical system 104. A reading unit including the CCD sensor 105 moves in the direction of an arrow K1 so as to convert the original document into an electrical signal data string for each line. Note that not the reading unit but the original document may move. A reader image processing unit 108 converts the electrical signal data string into an image signal.

Figure 2:
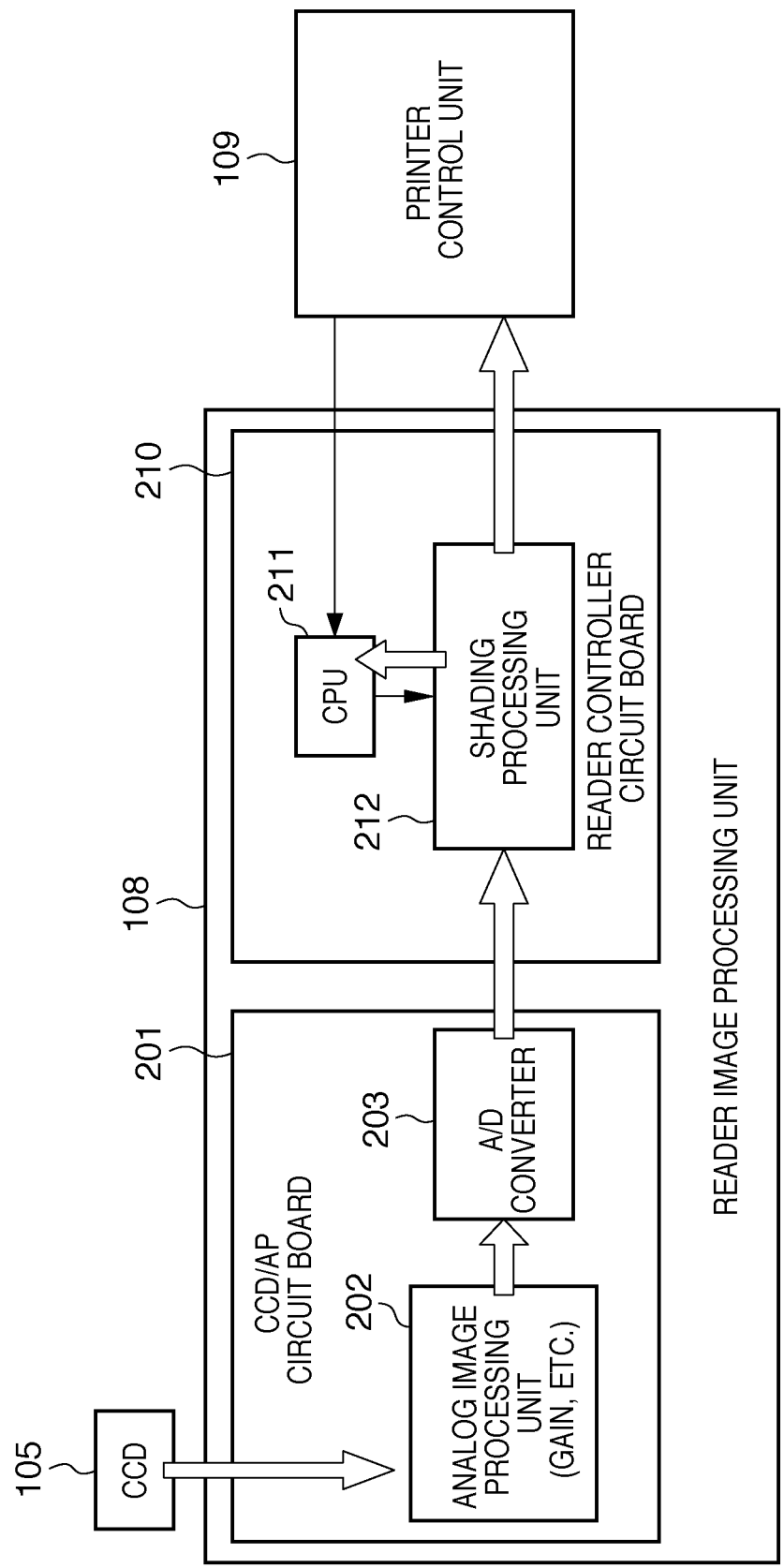
FIG. 2 is a block diagram of a reader image processing unit.

The image signal obtained by the CCD sensor 105 shown in FIG. 2 undergoes gain adjustment and the like by an analog image processing unit 202 of a CCD/AP circuit board 201. An A/D converter 203 then converts the signal into a digital image signal, and outputs it to a reader controller circuit board 210. A shading processing unit 212 of the reader controller circuit board 210 performs shading correction of the image signal under the control of a CPU 211, and outputs the signal to a printer control unit 109 of the printer unit B. At this point of time, the image signal contains R, G, and B luminance information.

The printer unit B will be described next. Referring to FIG. 1, the printer control unit 109 converts the image signal into a laser beam that has undergone PWM (Pulse Width Modulation). The laser beam is deflected and scanned by a polygon scanner 110 so as to expose photosensitive drums 121, 131, 141, and 151 of image forming units 120, 130, 140, and 150. Electrostatic latent images are thus formed. The image forming units 120, 130, 140, and 150 correspond to yellow (Y), magenta (M), cyan (C), and black (Bk), respectively. The image forming units 120, 130, 140, and 150 have almost the same arrangement, and only the image forming unit 120 for yellow will be explained. A primary charger 122 charges the surface of the photosensitive drum 121 to a predetermined potential. A developer 123 develops the electrostatic latent image on the photosensitive drum 121 to form a toner image. A transfer blade 124 discharges the photosensitive drum 121 from the back surface of a transfer belt 111 so as to transfer the toner image on the photosensitive drum 121 to a printing medium on the transfer belt 111. Then, a fixing unit 114 fixes the toner image on the printing medium.

Note that the photosensitive drums 121, 131, 141, and 151 have surface electrometers 125, 135, 145, and 155, respectively, to measure their surface potentials. The surface electrometers 125, 135, 145, and 155 are used to adjust the contrast potential.

Figure 3:
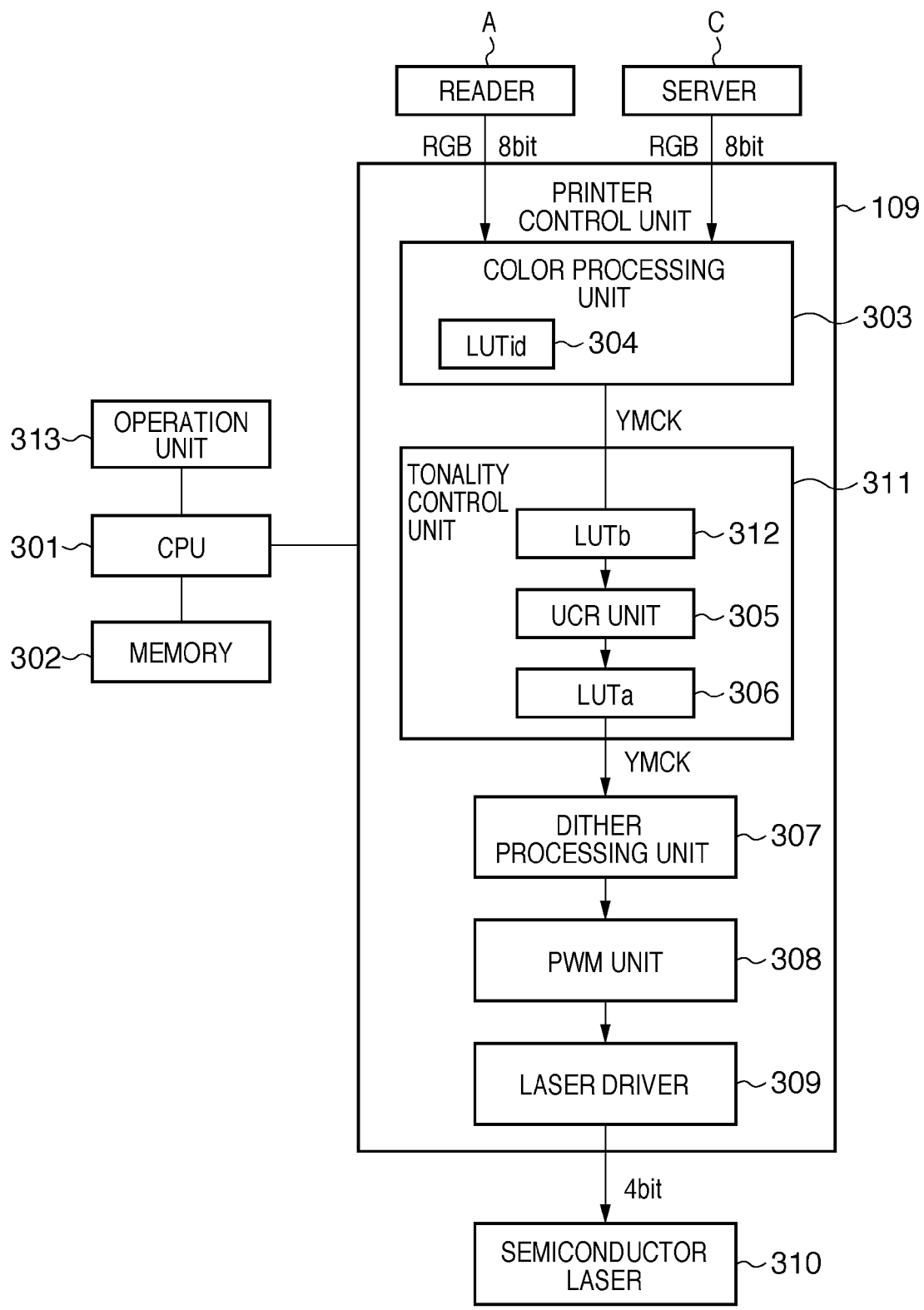
FIG. 3 is a block diagram showing a printer control unit 109.

The units of the printer control unit 109 shown in FIG. 3 are subject to centralized control of a CPU 301. A memory 302 is formed from a ROM and RAM to store control programs and various kinds of data. The image signal processed by the reader unit A or print server C is input to a color processing unit 303 of the printer control unit 109. The color processing unit 303 applies image processing and color processing to the input image signal so as to obtain a desired output when the printer has ideal output characteristics. The number of tones of the input signal are eight bits. To improve the accuracy, the color processing unit 303 extends it to 10 bits. After that, a dither processing unit 307 performs dither processing of the image signal to convert it into a 4-bit signal. A LUTid 304 is a luminance-density conversion table that converts luminance information contained in the image signal from the reader unit A into density information. The LUTid 304 is prepared first for a specific type of printing medium. In this embodiment, an operation of adding an arbitrary type of printing medium is performed, thereby adding the LUTid 304 for the arbitrary type of printing medium.

A tonality control unit 311 includes a LUTb 312, UCR unit 305, and LUTa 306, and corrects the image signal to adjust the printer unit B to the ideal characteristics. The LUTa 306 and the LUTb 312 are 10-bit conversion tables to be used to correct the density characteristic, and particularly used to change the γ characteristic of the printer unit B. The LUTa 306 is created for a specific type of printing medium X to appropriately adjust the characteristics of the printer unit B. Note that the specific type of printing medium X is a printing medium designed in advance by the manufacturer of the image formation apparatus to obtain desired tonality. The LUTa 306 of the present invention is commonly used for other printing media as well. Hence, the LUTa 306 has a function of making the characteristics of the printer unit B using an arbitrary type of printing medium equal or close to those of the printer unit B using the specific type of printing medium. The LUTb 312 is used to appropriately adjust the gradation characteristic of each printing medium. Hence, the LUTb 312 is prepared for each printing medium. The UCR unit 305 is a circuit for limiting the sum of image signal levels by regulating the integrated value of image signals in each pixel. If the sum exceeds a predetermined value, the UCR unit 305 performs UCR (UnderColor Removal) of replacing a predetermined amount of CMY signals with a K signal, thereby decreasing the sum of image signal levels. Regulating the sum of image signal levels is necessary for regulating the amount of applied toner in image formation by the printer unit B. Appropriately adjusting the operation of the printer unit B according to this embodiment means preventing, for example, image quality degradation caused by the amount of applied toner more than the predetermined amount. In this embodiment, the LUTb 312 arranged before the UCR unit 305 adjusts the gradation characteristic. For this reason, even when the gradation characteristic is optimized for an arbitrary type of printing medium, the amount of applied toner never exceeds the predetermined value.

The signal output from the tonality control unit 311 undergoes dither processing by the dither processing unit 307 and pulse width modulation by a PWM unit 308. A laser driver 309 causes a semiconductor laser to emit light using the PWM-modulated signal. To do this, the dither processing unit 307 performs halftone processing to convert the 10-bit image signal into 4-bit data.

<Control of Image Forming Conditions>

The feature of the present invention is to perform calibration using not a specific type of printing medium designated in advance by the manufacturer but another type of printing medium, thereby obtaining an appropriate printer characteristic for the specific type of printing medium. Calibration using the preset specific type of printing medium X will be described first. The printing medium X is, for example, a printing medium designated by the manufacturer of the image formation apparatus upon shipping at the factory or a printing medium designated at the time of maintenance by the maintenance engineer. In this embodiment, there exist a first calibration function of controlling the contrast potential and a second calibration function of controlling the γ correction circuit (LUTa 306) for image data.

I. First Calibration

Figure 4:
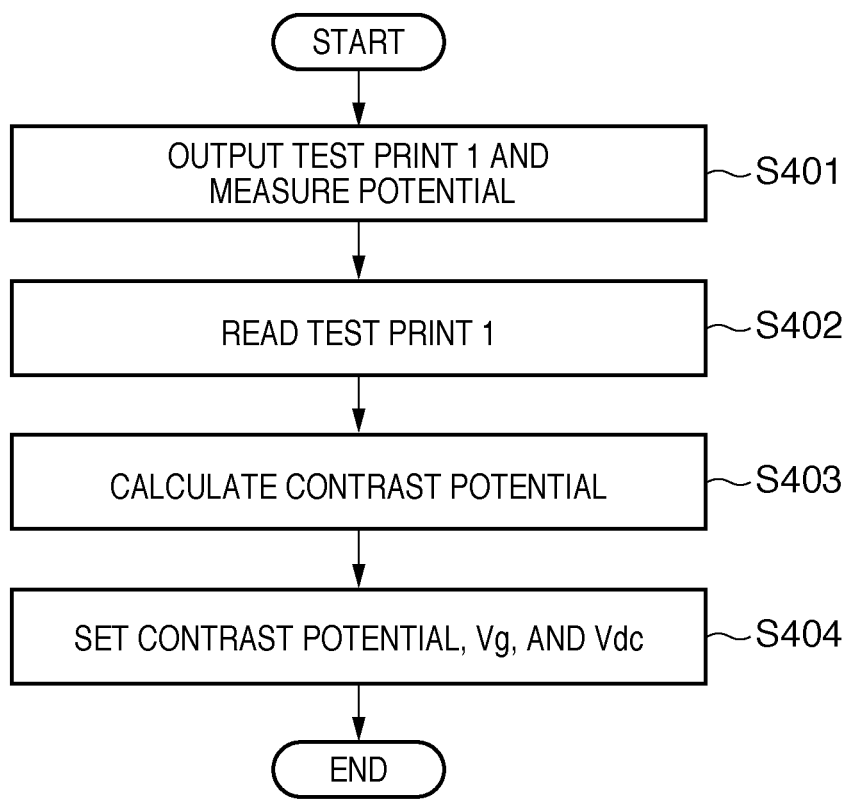
FIG. 4 is a flowchart illustrating a contrast potential computation processing in the first calibration.

Referring to FIG. 4, the CPU 301 functions as a first calibration unit which performs first calibration to determine the contrast potential using first luminance information obtained from an image formed on a specific type of printing medium.

In step S401, the CPU 301 outputs a first test print, and measures the surface potential of the photosensitive drum. For example, the CPU 301 creates a first test pattern and outputs it to the color processing unit 303, thereby forming, as an image, the first test pattern on the specific type of printing medium X. This is the first test print. Note that as the contrast potential to be used to output the first test print, an initial value predicted to achieve the target density in the atmospheric environment (for example, absolute water content) at that time is set. The memory 302 is assumed to store contrast potential values corresponding to various atmospheric environments. The CPU 301 measures the absolute water content, and determines the contrast potential corresponding to the measured absolute water content. The first test pattern is formed from, for example, a strip pattern including halftone densities of Y, M, C, and Bk, and a patch pattern including maximum density patches (for example, 255-level density signals) of Y, M, C, and Bk. The surface electrometers 125, 135, 145, and 155 measure the actual contrast potentials upon forming the maximum density patches.

Figure 19A:
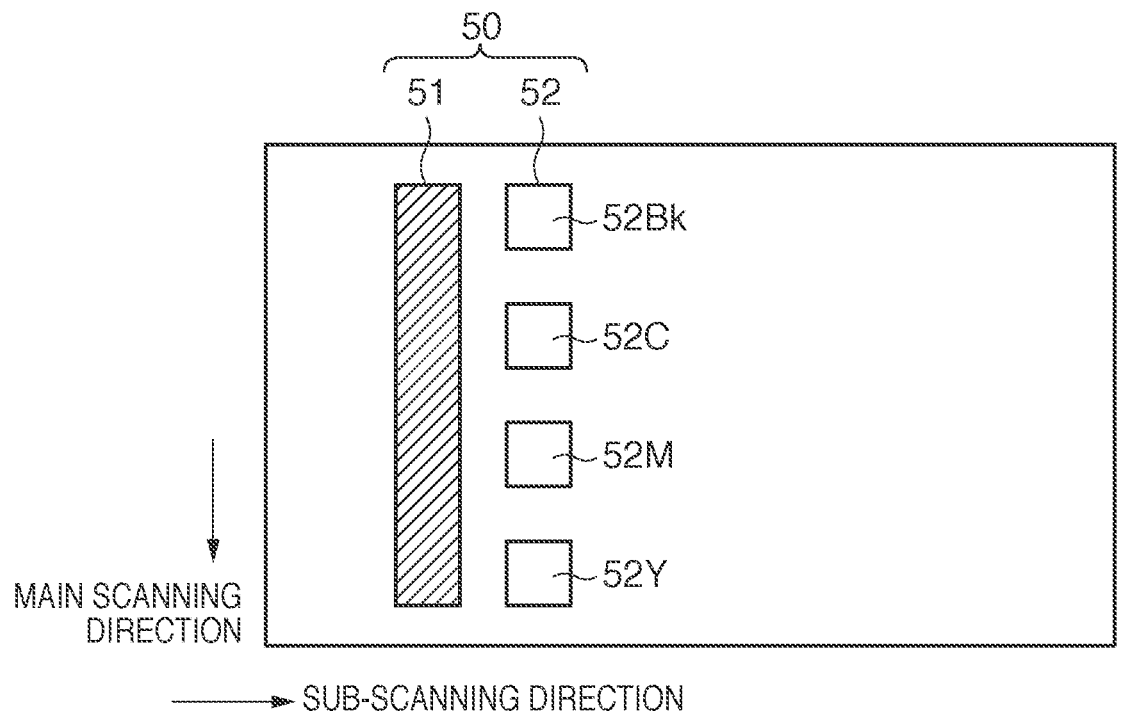
FIG. 19A is a view showing an example of a pattern image usable for the first calibration.

As shown in FIG. 19A, a first test pattern 50 is an example of a first pattern image including, for example, a strip pattern 51 and a patch pattern 52. The strip pattern 51 is a strip-like pattern including halftone densities of Y, M, C, and Bk. The patch pattern 52 includes patch patterns 52Y, 52M, 52C, and 52Bk, which are the maximum density patches (for example, 255-level density signals) of Y, M, C, and Bk. The surface electrometers 125, 135, 145, and 155 measure the actual contrast potentials upon forming the maximum density patches.

In step S402, the reader unit A reads the output first test print, and transfers the R, G, and B values to the CPU 301 of the printer control unit 109. The CPU 301 converts the R, G, and B values into optical densities using an LUTid (X) prepared in advance for the specific type of printing medium X. The LUTid (X) is a conversion table set in accordance with the relationship between density information in the specific type of printing medium X and the read luminance values in the reader unit A. A LUTid (Z) (to be described later) which makes an arbitrary type of printing medium Z usable for calibration is created by changing the LUTid (X). Note that the LUTid (X) is a table to be used to convert a luminance value I (X) obtained from an image formed on the specific type of printing medium X into a density value D (X) for the specific type of printing medium X. On the other hand, the LUTid (Z) is a table to be used to convert a luminance value I (Z) obtained from an image formed on another type of printing medium Z into the density value D (X) for the specific type of printing medium X. That is, the LUTid (X) is used to perform calibration using the specific type of printing medium X, and the LUTid (Z) is used to perform calibration using the other type of printing medium Z instead of the printing medium X. The LUTid (Z) can be regarded as a table to be used to convert the density value D (Z) of the other type of printing medium Z into the density value D (X) of the specific type of printing medium X. In this embodiment, however, the luminance value I (Z) of the other type of printing medium Z is directly converted into the density value D (X) of the specific type of printing medium X. To perform calibration using not the specific type of printing medium X but the other type of printing medium Z, the LUTid (Z) for the other type of printing medium Z is created and registered in the storage device. Note that a LUTa created as a result of calibration is a table to be used to maintain the gradation characteristic upon forming an image on the specific type of printing medium X. A LUTa created using the other type of printing medium Z and the LUTid (Z) is also a table to be used to maintain the gradation characteristic upon forming an image on the specific type of printing medium X, as a matter of course. That is, the LUTa is not a table to be used to maintain the gradation characteristic upon forming an image on the other type of printing medium Z. As a table to be used to maintain the gradation characteristic upon forming an image on the other type of printing medium Z, a LUTb is separately created and registered in the storage device.

Figure 5:
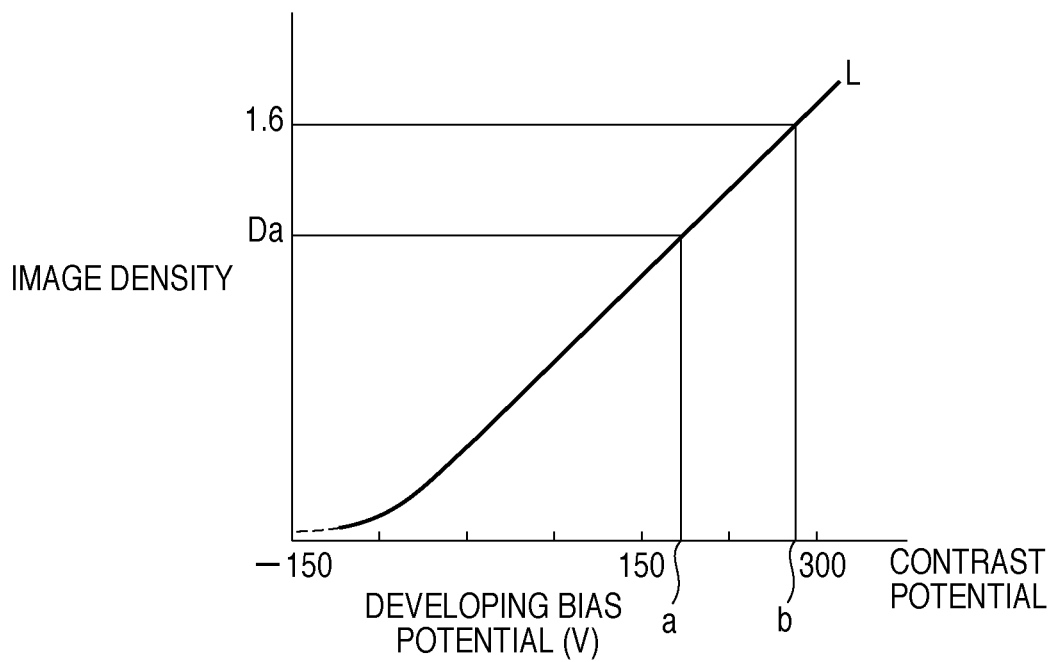
FIG. 5 is a graph showing the relationship between the contrast potential and image density information.

In step S403, the CPU 301 computes a contrast potential b corresponding to the target maximum density. Referring to FIG. 5, the abscissa represents the development bias potential, and the ordinate represents the image density. The contrast potential is the difference between the development bias potential and the surface potential of the photosensitive drum when the semiconductor laser 310 of each color emits light at the maximum level after the primary charge of the photosensitive drum. Assume that the maximum density obtained from a first test print formed using a contrast potential a is Da. In this case, near the maximum density (density of 0.8 to 2.0), the image density is linear with respect to the contrast potential b, as indicated by a solid line L. The solid line L is determined by the contrast potential a and the maximum density Da. In this embodiment, for example, the target maximum density is set to 1.6. The CPU 301 computes the contrast potential b corresponding to the target maximum density based on the solid line L. The memory 302 is assumed to store a table or a function corresponding to the solid line L in advance. The contrast potential b is computed by, for example, $$b=(a+ka)\times 1.6/Da \quad (1)$$

where ka is a correction coefficient determined by the type of developing method.

In step S404, the CPU 301 determines and sets a grid potential Vg and a development bias potential Vds based on the contrast potential b.

Figure 6:
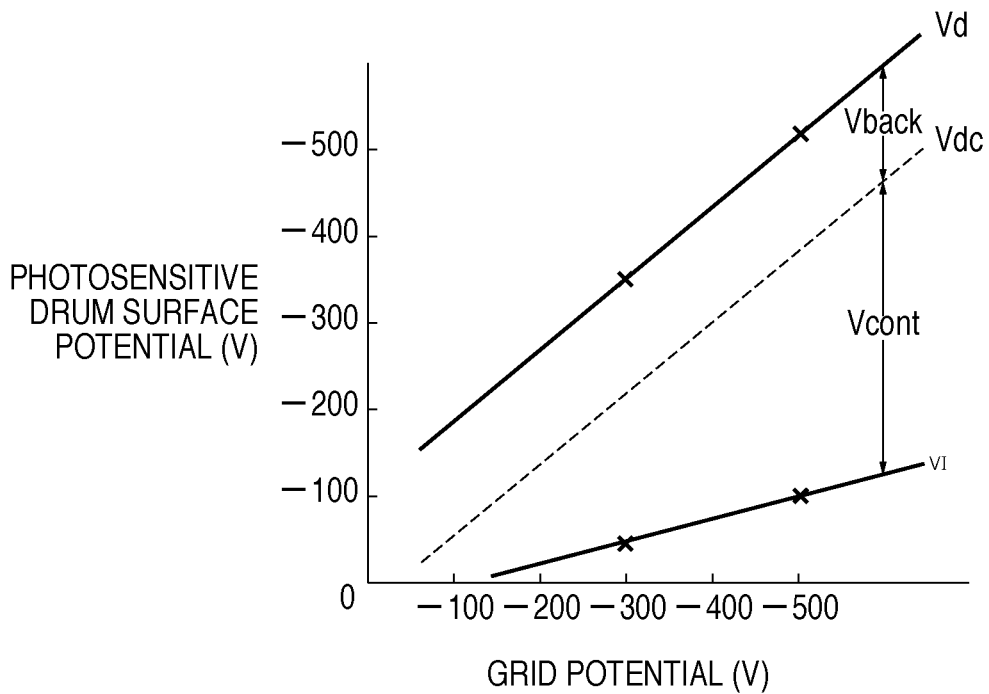
FIG. 6 is a graph showing the relationship between a grid potential Vg and a photosensitive drum surface potential.

Referring to FIG. 6, the CPU 301 sets the grid potential Vg to −300 V, performs scanning while minimizing the emission pulse level of the semiconductor laser 310 of each color, and causes each of the surface electrometers 125, 135, 145, and 155 to measure a surface potential Vd. In addition, the CPU 301 sets the grid potential Vg to −300 V, and causes each of the surface electrometers 125, 135, 145, and 155 to measure a surface potential Vl when the emission pulse level of the semiconductor laser 310 of each color is maximized. Similarly, the CPU 301 sets the grid potential Vg to −700 V, and measures the surface potentials Vd and Vl. The CPU 301 can obtain the relationship between the grid potential and the photosensitive drum surface potential shown in FIG. 6 by interpolating or extrapolating the data at the −300 V and the data at −700 V. Control to obtain the potential data is called potential measurement control.

A contrast potential Vcont is determined as the difference voltage between a development bias Vdc and the surface potential Vl. The maximum density can be set higher as the contrast potential Vcont becomes higher. The CPU 301 determines the grid potential Vg corresponding to the determined contrast potential b based on the relationship shown in FIG. 6. The CPU 301 determines the corresponding surface potential Vd based on the determined grid potential Vg and the relationship shown in FIG. 6. The CPU 301 also determines the development bias Vdc by subtracting Vback (for example, 150 V) from the surface potential Vd. The potential Vback is determined not to make fogging toner adhere to an image.

II. Second Calibration

As is well known, an image formation apparatus such as a copying machine forms a duplication (output image) by reading an original document image. That is, the density (gradation characteristic) of the original document image needs to match the density (gradation characteristic) of the output image. In the processes performed by the copying machine, the original document image is converted into a luminance signal and then into a density signal corresponding to the luminance value signal. The density signal is converted into a laser output signal corresponding to the amount of applied toner. A laser beam corresponding to the laser output signal irradiates the image carrier to form an electrostatic latent image. The electrostatic latent image is developed by toner to form a toner image. The toner image is transferred to a printing medium, and fixed by the fixing unit. An output image is thus formed.

Figure 7:
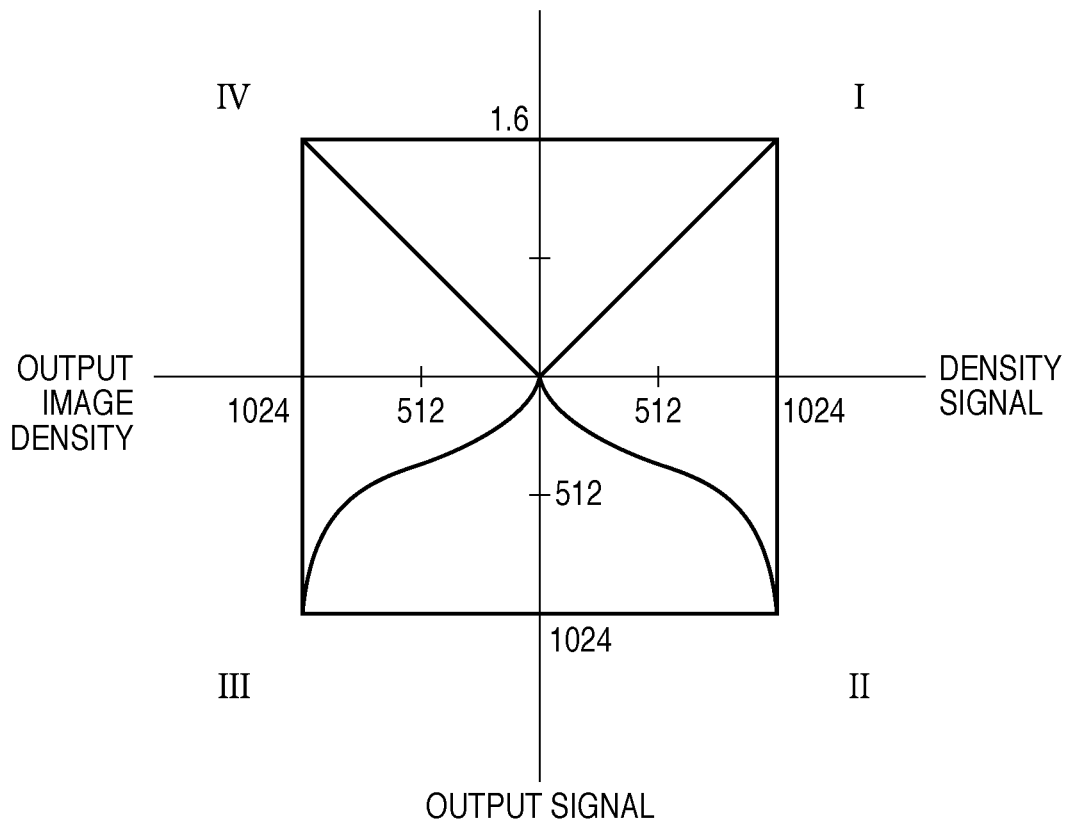
FIG. 7 is a characteristic conversion chart showing characteristics necessary for reproducing image density of an original document.

FIG. 7 shows the relationship between signals in the series of copy processes of forming an output image from an original document. A region I represents the characteristic of the reader unit A that converts the image density of original document into a density signal. Note that the image density of original document is expressed as an optical density obtained by reading an original document using an optical densitometer. The number of tones of the density signal is 1,024. A region II represents the characteristic of the tonality control unit 311 (LUTa 306 and LUTb 312) that converts the density signal into a laser output signal. The number of tones of the laser output signal is also 1,024. A LUTa and LUTb (X) for the specific type of printing medium X are set here. The LUTb (X) has a linear characteristic with respect to the specific type of printing medium X. Hence, only the LUTa actually acts on the tonality control unit 311. That is, the LUTb (X) only returns an input value directly as an output value, and can therefore be omitted. A region III represents the characteristic of the printer unit B that converts the laser output signal into an output image density. The output image density is sometimes called a printing density. The number of tones of the output image density is 1,024. A region IV represents the relationship between the image density of original document and the printing density. This relationship represents the overall gradation characteristic of the copying machine 100 according to the embodiment.

To obtain a linear gradation characteristic in the region IV, the copying machine 100 corrects the distortion of the printing characteristic of the printer unit B in the region III by the tonality control unit 311 in the region II. The LUTa can easily be created only by replacing the input with the output of the characteristic in the region III obtained upon outputting a test print without making the tonality control unit 311 act. That is, the pattern image on the test print includes a plurality of patches of different tones. The amount of applied toner (output signal) used to form each patch is already known, as a matter of course. On the other hand, the density of each patch is read by the reader unit A as luminance information and converted into a density signal by the LUTid. The relationship between the different amounts of applied toner (output signals) given as inputs and density signals (density values) as corresponding outputs is thus obtained. Hence, reversing the relationship between the input and the output allows to obtain an amount of applied toner (output signal) that should be output in correspondence with a density signal given as an input. That is, the LUTa represents the relationship between the density signal and the output signal.

Figure 8:
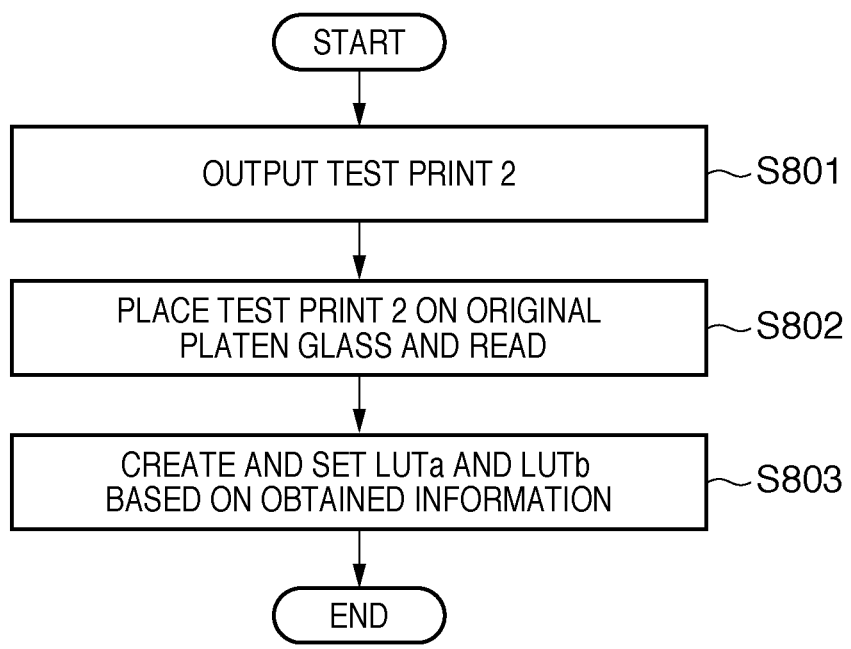
FIG. 8 is a flowchart illustrating the second calibration.

Referring to FIG. 8, the CPU 301 performs second calibration to determine the image forming condition concerning the gradation characteristic by acquiring the relationship between the optical density and the output density from an image formed on an arbitrary type of printing medium using second conversion setting information. The second calibration is normally performed after the first calibration. The CPU 301 thus functions as a calibration performing unit which performs calibration using a printing medium determined by a determination unit.

In step S801, the CPU 301 performs output of a second test print. For example, the CPU 301 creates a second test pattern and outputs it to the color processing unit 303, thereby forming, as an image, the second test pattern on the specific type of printing medium X. This is the second test print. At this time, the CPU 301 performs image formation without making the LUTa of the tonality control unit 311 act. The density signals Y, M, C, and K output from the UCR unit 305 are input to the dither processing unit 307 while detouring around the LUTa 306.

Figure 19B:
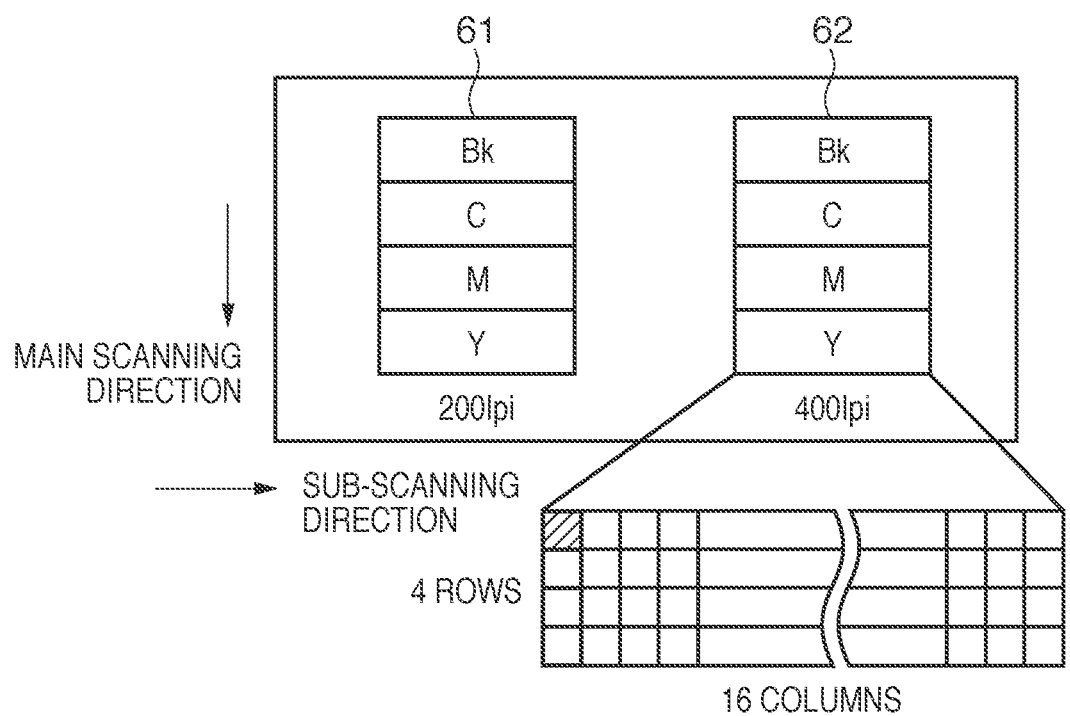
FIG. 19B is a view showing an example of a pattern image usable for the second calibration and printing medium addition processing.

In the second test print, for example, a second test pattern (patch groups 61 and 62) having 4 rows×16 columns (i.e., 64 tones) in gradation for each of the Y, M, C, and Bk is formed, as shown in FIG. 19B. For example, low-density regions out of a total of 256 tones are preferentially assigned to the 64-tone patches. This allows to adjust the gradation characteristic of the highlighted portion well. Note that a second test pattern for low resolution (160 to 180 lpi) and that for high resolution (250 to 300 lpi) may separately be prepared. In FIG. 19B, the former is the patch group 61, and the latter is the patch group 62. "Lpi" stands for lines/inch. To form an image of each resolution, the dither processing unit 307 performs dither processing using parameters corresponding to the resolution. Note that a halftone image is formed at a resolution of about 160 to 180 lpi, and a line image such as a character is formed at a resolution of about 250 to 300 lpi. Test patterns of the same tone level are output at the two resolutions. If the gradation characteristic largely changes due to the difference in resolution, the tone level is set in accordance with the resolution. If the printer unit B has a capability of forming an image at three or more resolutions, the test print for the second calibration may be divided into a plurality of pages.

In step S802, the reader unit A reads an image from the second test pattern. The luminance values of R, G, and B output from the second test pattern are input to the color processing unit 303. The color processing unit 303 converts the luminance values of R, G, and B into density values using the LUTid (X).

In step S803, the CPU 301 associates each density value with the laser output level used to create the second test pattern and the test pattern (halftone patch) creation position, thereby creating a table representing the relationship between the laser output signal level (amount of applied toner) and the density signal. The CPU 301 writes the created table in the memory 302. At this point of time, the CPU 301 can obtain the characteristics of the printer unit B in the region III of FIG. 7. As described above, the LUTa of the printer unit B is determined by replacing the input with the output of the characteristic, and is set in the tonality control unit 311.

In some cases, data is short to obtain the LUTa by computation. This is because halftone patches of only 64 tones are created although data of 256 tones are originally required. The CPU 301 creates necessary data by interpolating data in shortage. The second calibration allows to implement a linear gradation characteristic with respect to the target density. Note that when determining the LUTb (X), after the tonality control unit 311 is set to effectively apply/enable the LUTa, steps S801 to S803 are performed. The LUTb (X) can be determined by the same method as that of the LUTa. In this way, the LUTid (X), LUTa, and LUTb (X) are determined for the specific type of printing medium X. Note that unlike the LUTb (Z), the input values and output values are basically in a one-to-one correspondence in the LUTb (X). Hence, the LUTb (X) itself may be omitted. This is because the LUTa includes information corresponding to the LUTb depending on the specific type of printing medium X.

In the above-described embodiment, the first calibration and second calibration are sequentially performed. However, only one of them may individually be performed. In this embodiment, performing calibration makes it possible to effectively correct a variation in the image density, image reproducibility, or tone reproducibility that can occur in a short or long term. It is therefore possible to maintain the image quality.

<Operation of Adding Arbitrary Type of Printing Medium>

A case in which a printing medium usable for calibration is added will be described next. The feature of this embodiment is to appropriately adjust the printer characteristics by calibration using an arbitrary type of printing medium. The arbitrary type of printing medium is a printing medium of type different from the specific type of printing medium, and can arbitrarily be selected by the operator. In this case, the CPU 301 functions as an adding unit which performs addition processing of adding an arbitrary type of printing medium as a printing medium usable for calibration.

If an arbitrary type of printing medium is used for calibration which is assumed to use a specific type of printing medium, a problem is posed in the corrected printer output characteristics. For the specific type of printing medium, the amount of applied toner is known, and calibration is designed not to make defects in an image. Hence, the gradation characteristic for the specific type of printing medium can be adjusted to the desired characteristic by performing calibration using the specific type of printing medium. However, for an arbitrary type of printing medium, the relationship between the density and the amount of applied toner is unknown. Hence, if another type of printing medium is used for calibration that is assumed to use the specific type of printing medium, the amount of applied toner may exceed the amount assumed in design. In this case, problems may arise in transfer or fixing, resulting in image quality degradation.

Figure 9:
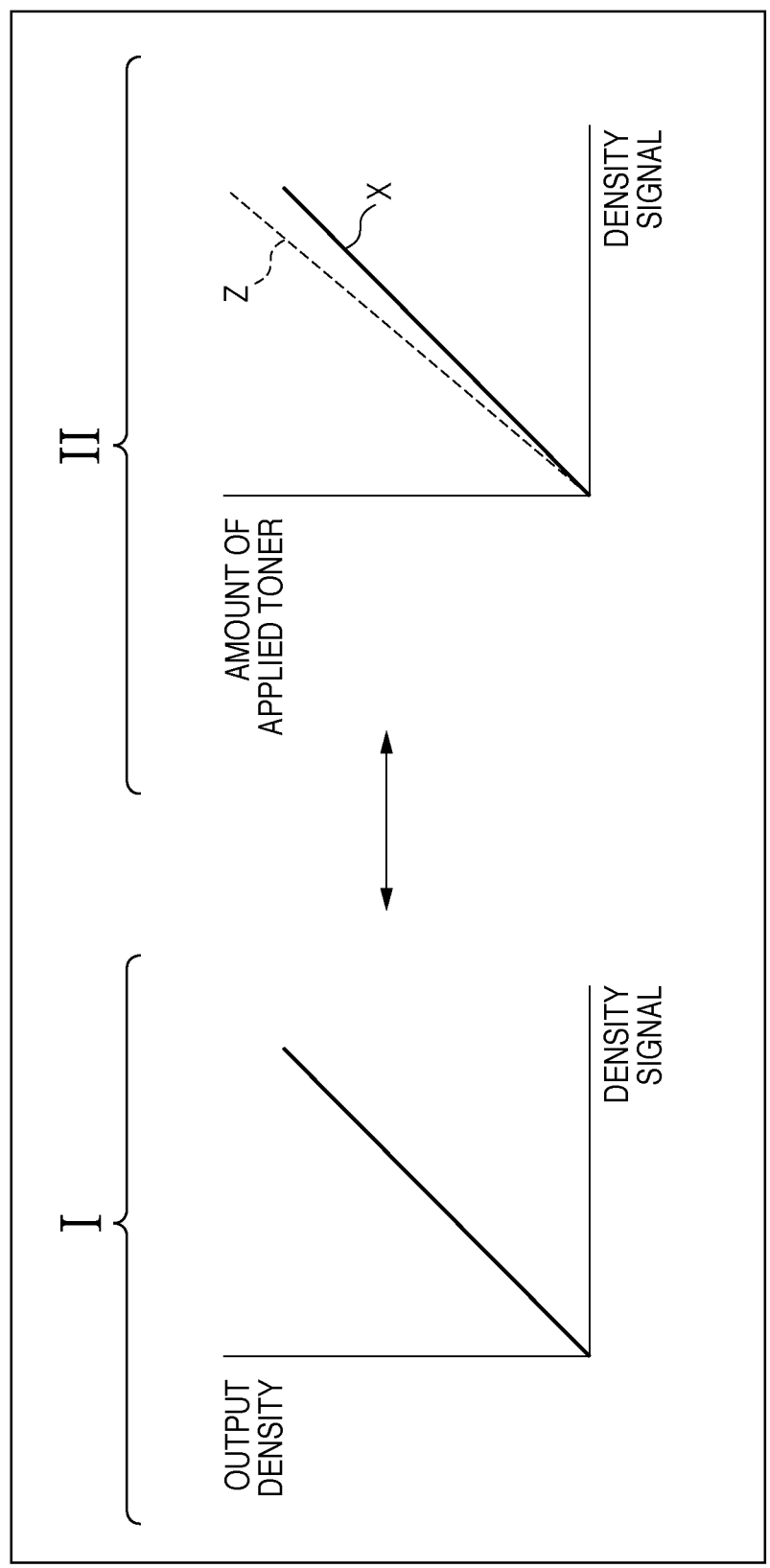
FIG. 9 shows graphs for explaining the characteristic difference between printing media.

FIG. 9 exemplifies the other type of printing medium Z whose output density is lower at the same amount of applied toner than that of the specific type of printing medium X. Assume that the image forming conditions are set so that both the specific type of printing medium X and the other type of printing medium Z exhibit the output density characteristic shown in (I) of FIG. 9 for a certain primary color. (II) of FIG. 9 shows the amount of applied toner on each printing medium with respect to the density signal. That is, the amount of applied toner on the other type of printing medium Z is larger than that on the specific type of printing medium X. When the secondary color, tertiary color, and the like are output in this state, toner in an amount more than assumed exists on the printing medium Z, resulting in a fixing failure.

In this embodiment, the sum of image signal levels is regulated immediately before the LUTa, thereby relaxing the excess amount of applied toner. To implement this, identical pattern images (image patterns) are formed on the specific type of printing medium X and the arbitrary type of printing medium Z using the same image signal. The same image signal is used to equalize the amounts of applied toner on the specific type of printing medium X and the arbitrary type of printing medium Z. The reader unit A reads the image from each of the specific type of printing medium X and the arbitrary type of printing medium Z, and determines the luminance values. The CPU 301 computes the luminance difference between the luminance values. The difference is corrected using the LUTid. For example, the CPU 301 adds the luminance value difference to the LUTid (X) for the specific type of printing medium X, thereby creating the LUTid (Z) to be used to convert the luminance value I (Z) acquired from the arbitrary type of printing medium Z into the density value D (X) of the specific type of printing medium X. Hence, when performing calibration using the arbitrary type of printing medium Z, the LUTid (Z) is set in the color processing unit 303 so as to create a LUTa that implements the same tonality as that obtained by performing calibration using the specific type of printing medium X. The LUTid (Z) for the other type of printing medium Z is created and recorded in the memory 302 in this way. The CPU 301 reads out, from the memory 302, the LUTid (Z) corresponding to the designated other type of printing medium Z, and sets it in the color processing unit 303. That is, it is important to additionally register the other type of printing medium Z usable for calibration in place of the specific type of printing medium X.

Figure 10:
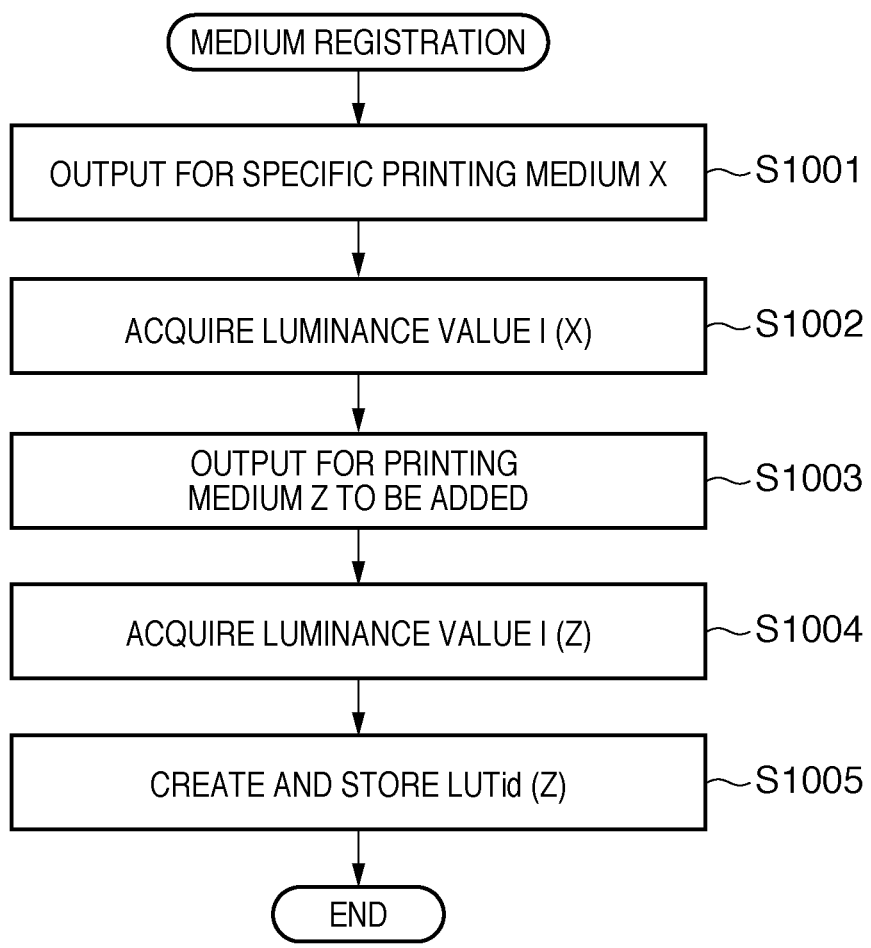
FIG. 10 is a flowchart illustrating an operation of adding a printing medium.

Referring to FIG. 10, when the user instructs to additionally register a printing medium for calibration via a button of an operation unit 313 provided on the copying machine 100, the CPU 301 activates the adding operation. In step S1001, the CPU 301 selects the specific type of printing medium X, and forms an image pattern on it. As the image pattern, the second test pattern to be used for second calibration as shown in FIG. 19B can be adopted. The printer unit B corresponds to an image forming unit which forms an image on each of the specific type of printing medium usable for calibration and the arbitrary type of printing medium using the same image signal so as to add the arbitrary type of printing medium as a printing medium usable for calibration. In step S1002, the reader unit A reads the image pattern formed on the specific type of printing medium X, generates the read luminance value I (X), and transfers it to the CPU 301 of the printer control unit 109. The luminance value I (X) corresponds to first luminance information obtained from the image formed on the specific type of printing medium.

In step S1003, the CPU 301 selects the arbitrary type of printing medium Z to be added, and forms the second test pattern on it. In step S1004, the reader unit A reads the image pattern formed on the printing medium Z, generates the read luminance value I (Z), and transfers it to the CPU 301 of the printer control unit 109. The luminance value I (Z) corresponds to second luminance information obtained from the image formed on the arbitrary type of printing medium. Image data and image processing used to acquire the read luminance value I (Z) are the same as those used to acquire the read luminance value I (X).

In step S1005, the CPU 301 creates the LUTid (Z) to be used for calibration using the printing medium Z by applying the following method to the read luminance values I (X) and I (Z), and stores the LUTid (Z) in the memory 302 or the color processing unit 303. A detailed method of creating the LUTid (Z) will be described below. Note that the LUTid (Z) corresponds to second conversion setting information which is used to convert luminance information into density information for the arbitrary type of printing medium.

Figure 11:
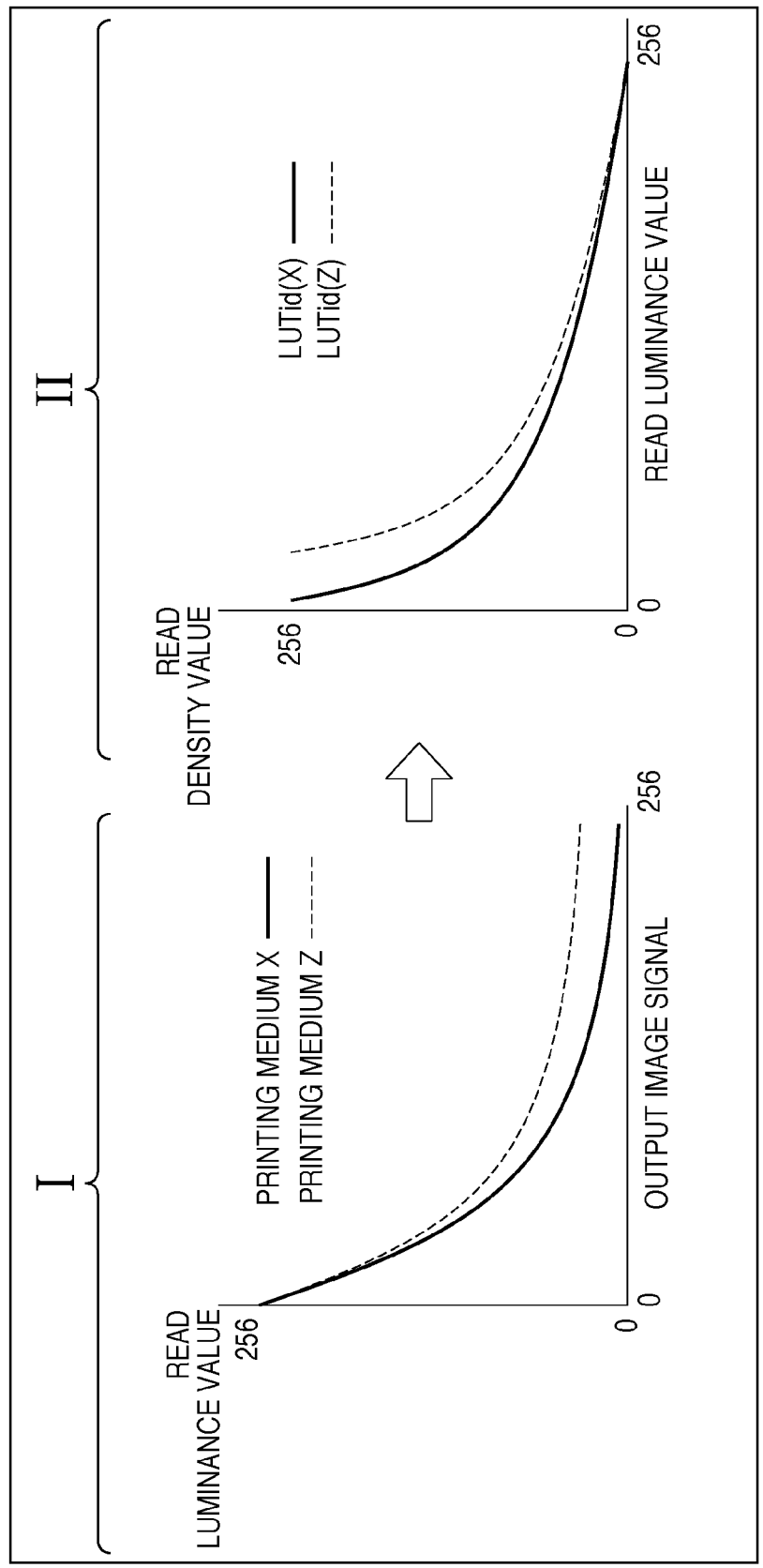
FIG. 11 shows graphs for explaining a method of creating a LUTid (Z) for an arbitrary type of printing medium Z.

Referring to FIG. 11, (I) represents the relationship between the output image signal and the read luminance value for each of the specific type of printing medium X and the arbitrary type of printing medium Z. (II) of FIG. 11 represents the relationship between the read luminance value and the read density value. Note that the density value on the printing medium Z is converted into that on the printing medium X.

The read luminance value I (X) for the specific type of printing medium X and the read luminance value I (Z) for the arbitrary type of printing medium Z are luminance values read from the images formed on the printing media X and Z using the same image signal (=the same amount of applied toner). Based on the luminance values I (X) and I (Z), the CPU 301 computes the luminance difference between the specific type of printing medium X and the arbitrary type of printing medium Z necessary for achieving the same amount of applied toner. The CPU 301 thus functions as a first computation unit which computes the difference between first luminance information and second luminance information.

The CPU 301 adds the luminance difference to the LUTid (X), thereby creating the LUTid (Z) for the arbitrary type of printing medium Z. The CPU 301 thus functions as a second computation unit which computes the second conversion setting information by adding the difference to the first conversion setting information. The LUTid (X) corresponds to first conversion setting information which is used to convert luminance information into density information for the specific type of printing medium. The CPU 301 also functions as a creation unit which creates the second conversion setting information using the first luminance information, second luminance information, and first conversion setting information.

Figures 12, 13:
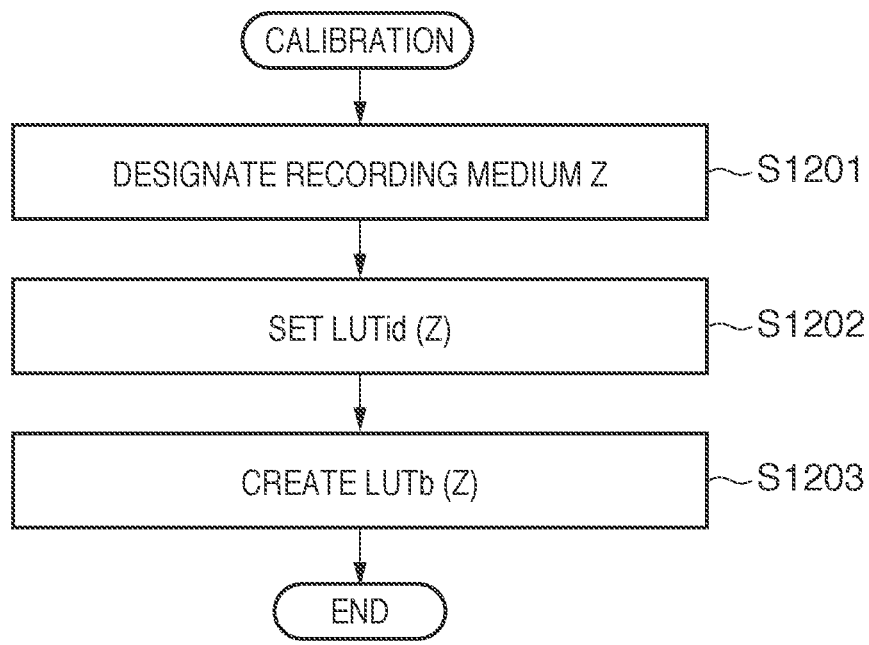
FIG. 12 is a flowchart illustrating calibration using an added printing medium.
FIG. 13 is a view showing an example of a characteristic table that registers the characteristics of added printing media.

Referring to FIG. 12, in step S1201, the CPU 301 causes the operator to designate, via the operation unit 313, a printing medium to be used. FIG. 12 shows an example where the medium Z is designated. In step S1202, if the printing medium X is designated, the CPU 301 sets the LUTid (X) in the color processing unit. If the printing medium Z is designated, the CPU 301 sets the LUTid (Z) in the color processing unit. The CPU 301 thus functions as a designation unit which designates a printing medium to be used for calibration. In step S1203, the CPU 301 performs first calibration (S401 to S404) and second calibration (S801 to S803). Especially the LUTb (Z) is created by the second calibration. Note that the color processing unit 303 performs conversion processing using the LUTid corresponding to the printing medium designated by the CPU 301. The color processing unit 303 thus functions as a conversion unit which, when the designation unit has designated the specific type of printing medium, converts luminance information obtained from the image formed on the specific type of printing medium into density information using the first conversion setting information. The color processing unit 303 also functions as a conversion unit which, when the designation unit has designated the arbitrary type of printing medium, converts luminance information obtained from the image formed on the arbitrary type of printing medium into density information using the second conversion setting information.

According to this embodiment, the second conversion setting information (LUTid (Z)) for the printing medium Z is created from the characteristic (luminance value I (X)) of the specific type of printing medium X, the characteristic (luminance value I (Z)) of the arbitrary type of printing medium Z, and the first conversion setting information (LUTid (X)) for the printing medium X. This enables to perform calibration using the arbitrary type of printing medium Z. Especially, the amounts of applied toner on the printing media can be equalized by forming an image on each of the printing media X and Z using the same image signal. Since the amount of applied toner is the same, the difference between the luminance value I (X) and luminance value I (Z) corresponds to the difference between the LUTid (X) and the LUTid (Z). Hence, when the difference between the luminance value I (X) and the luminance value I (Z) is added to the LUTid (X), the LUTid (Z) can be acquired relatively easily.

According to this embodiment, the monochrome output characteristic of the printer unit B can accurately be adjusted to the desired state. It is therefore also possible to increase the color reproduction accuracy when the printer control unit 109 or external controller performs color management using an ICC profile. Note that ICC stands for International Color Consortium.

In this embodiment, in the printing medium adding operation, image formation and reading on the printing medium Z are performed after image formation and reading on the printing medium X. However, image formation on the printing media X and Z may be performed first, and image reading from the printing media X and Z may be performed then. Either of the printing media X and Z can be processed first.

Note that the CPU 301 may register, as a table, the characteristics of the printing medium for calibration in a nonvolatile storage area (e.g., hard disk driver or EEPROM) of the memory 302. In the characteristic table shown in FIG. 13, the media type (for example, plain paper, coated paper), grammage, gloss level, and whiteness level are adopted as characteristics. The characteristic data of the specific type of printing medium X can be written in the characteristic table upon shipping at the factory. For an arbitrary type of printing medium Zi, the operator may input the data via the operation unit 313 in the above-described addition processing.

<Selection Method When a Plurality of Printing Media Are Registered for Calibration>

Performing the above-described addition processing allows to register a plurality of arbitrary types of printing media Z1 to Zn (n is the number of arbitrary types of printing media registered for calibration) in the printer control unit 109. The CPU 301 selects a LUTid (Zi) and LUTb (Zi) corresponding to the printing medium Zi designated by the operator via the operation unit 313 (not shown), and sets them in the printer control unit 109 (i ranges from 1 to n). The same setting can be done for the specific type of printing medium X as well, as a matter of course.

However, the calibration accuracy may change between the plurality of arbitrary types of printing media. This is mainly caused by the difference in media characteristics between the printing media or calculation errors. Especially, when a printing medium whose characteristics largely differ from those of a specific type of printing medium designated by the manufacturer in advance is registered for calibration, the calibration accuracy readily lowers. In addition, when an arbitrary type of printing medium Z2 is registered using parameters (LUTid (Z1) and the like) determined for a printing medium Z1, and an arbitrary type of printing medium Z3 is registered using parameters determined for the printing medium Z2, errors accumulate. Hence, when the number of arbitrary types of printing media increases, the errors accumulate in a chained manner, and the calibration accuracy lowers. In this embodiment, when a plurality of arbitrary types of printing media are registered for calibration, a printing medium of higher calibration accuracy is preferentially used.

The printing medium Zi appropriate from the viewpoint of calibration accuracy may be selected by the CPU 301 based on the characteristics of each printing medium or by the operator who refers to the characteristics of each printing medium displayed by the CPU 301 on the display device of the operation unit 313. The function of selecting a printing medium having close media characteristics will be described below in detail.

To determine or discriminate a printing medium close to the media characteristics of a specific type of printing medium, the CPU 301 computes media approximate values based on a media characteristic table stored in the memory 302. The CPU 301 selects another type of printing medium having a media approximate value with the minimum difference to the media approximate value of the specific type of printing medium X for calibration. There are various factors that determine the printing medium characteristics as the base of media approximate values. Examples of the factors are the media type, grammage, gloss level, smoothness level, whiteness level, and rigidity level. In this embodiment, as parameters to be used to obtain a media approximate value, focus is placed on the media type, grammage, gloss level, and whiteness level which are supposed to highly contribute to the gradation characteristic. Note that adding other parameters concerning the media characteristics does not damage the features of the present invention.

The media characteristic table of FIG. 14 shows examples of parameters (coefficients) used to determine media approximate values. The characteristic coefficients shown in FIG. 14 correspond to characteristic information indicating the characteristics of each of the plurality of arbitrary types of printing media added by the adding unit. If a computed media approximate value is closer to 1, the arbitrary type of printing medium Zi has characteristics closer to those of the other type of printing medium X. Conversely, if the media approximate value is far from 1, the characteristics are largely different. Hence, when the printing medium Zi having a media approximate value close to 1 is used, the calibration accuracy is expected to be higher.

The gloss level in the media approximate table shown in FIG. 14 can be measured by, for example, a handy glossmeter PG-1M (available from Nippon Denshoku Industries). The gloss level measuring method complies with JIS Z 8741.

Figure 16:
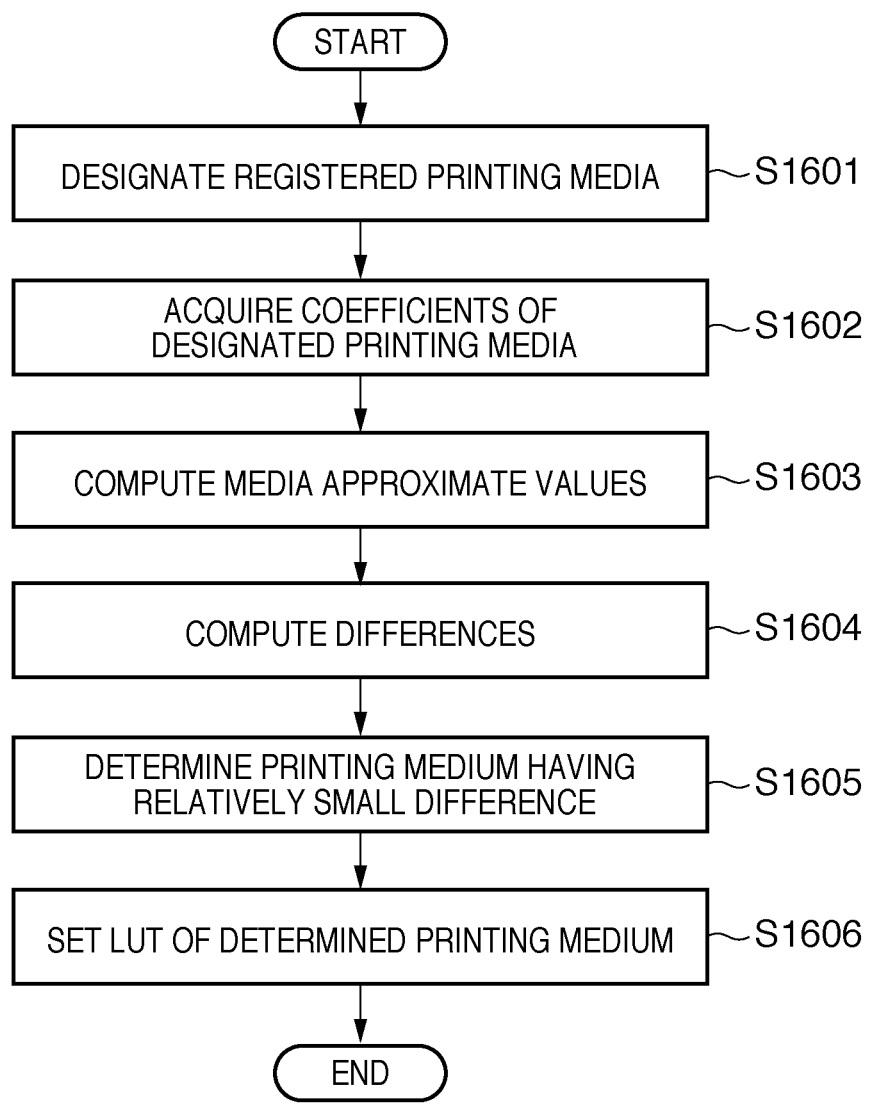
FIG. 16 is a flowchart illustrating an example of printing medium selection processing.

A printing medium selection method will be described below with reference to the flowchart shown in FIG. 16. For example, assume that the pieces of information of registered printing media shown in FIG. 13 are stored in the memory 302 serving as a storage unit. In step S1601, the CPU 301 designates registered printing media by referring to the registered printing medium information. In step S1602, the CPU 301 acquires coefficients for the designated printing media from the media characteristic table. In step S1603, the CPU 301 computes the media approximate values from the coefficients acquired for the plurality of designated printing media. For example, the media approximate value is computed by adding the coefficients of each computation target printing medium. The CPU 301 thus functions as a summing unit which sums a plurality of characteristic coefficients included in the characteristic information for each of the plurality of arbitrary types of printing media added by the adding unit, thereby computing the sum. In step S1604, the CPU 301 computes the difference between the media approximate value of each printing medium and the media approximate value ("1" in this case) of the specific type of printing medium, and also determines the absolute value of the difference. The CPU 301 thus functions as a difference unit which computes the absolute value of the difference between the sum and the value indicating the characteristics of a printing medium designated in advance. As the difference becomes closer to 0, the calibration accuracy of the printing medium is higher. In step S1605, the CPU 301 determines, out of the plurality of designated printing media, a printing medium having a relatively small difference by comparison processing. The CPU 301 thus functions as a comparison unit which compares the absolute values of the differences of the plurality of arbitrary types of printing media added by the adding unit.

FIG. 15 shows a computation example of the media approximate values of the printing media Z1 and Z2.

The Media Approximate Value of the Printing Medium Z1:

$$0+0.3+0+0.2=0.5$$

The Media Approximate Value of the Printing Medium Z2:

$$0.3+0.4+0.3+0=1.0$$

In the example shown in FIG. 15, the value of the printing medium Z1 is closer to 0. Hence, the CPU 301 selects the printing medium Z1. If the difference between the media approximate values of the plurality of arbitrary types of printing media registered rarely yields the difference in gradation characteristic, any registered printing medium can be selected. For example, the CPU 301 may display the information of the registered printing media on the display device of the operation unit 313, and cause the operator to select a printing medium. The CPU 301 selects, as the printing medium for calibration, the printing medium selected by the operator. As described above, not an arbitrary type of printing medium closest to the media characteristics of the specific type of printing medium X but, for example, the second or third close other arbitrary type of printing medium may be used to perform tonality control. Note that if the media approximate value difference to the specific type of printing medium X is 0.2 or less, the difference in the gradation characteristic is assumed to be very small. In step S1606, the CPU 301 sets the LUTid (Zi) of the selected printing medium Zi in the printer control unit 109. Note that the CPU 301 performs tonality control without using the LUTb (Zi) of the selected printing medium Zi.

The CPU 301 thus functions as a determination unit which determines an arbitrary type of printing medium relatively approximate to the characteristics of a printing medium designated in advance by comparing the characteristic information of the plurality of arbitrary types of printing media. Hence, when a plurality of arbitrary types of printing media are registered for calibration, a printing medium of higher calibration accuracy can preferentially be used. As the characteristic information, at least one of information indicating a type of printing medium, information indicating a grammage, information indicating a gloss level, information indicating a whiteness level, and information indicating a rigidity level is used. This is because these characteristics are supposed to highly contribute to the gradation characteristic. As described above, the CPU 301 serving as the determination unit may determine a plurality of arbitrary types of printing media including the most approximate arbitrary type of printing medium in accordance with the order of approximation to the characteristics of a printing medium designated in advance. This is because if the difference between the media approximate values of the plurality of arbitrary types of printing media registered rarely yields the difference in gradation characteristic, any registered printing medium can be selected. Alternatively, the CPU 301 may display, on the display device of the operation unit 313, the characteristic information comparison result for each of the plurality of arbitrary types of printing media including the most approximate arbitrary type of printing medium, and accept selection information of an arbitrary type of printing medium input by the operator who has referred to the comparison results. This allows to improve the operator's convenience. The operator inputs, via the operation unit 313, selection information indicating the printing medium to be selected, and the CPU 301 functions as an accepting unit which accepts the selection information.

[Second Embodiment]

The second embodiment is characterized by adding a printing medium registration order to the media approximate value calculation parameters. The arrangements and effects that are not exactly specified are basically the same as in the first embodiment. As described above, tonality control is performed for a designated printing medium X, and then, an arbitrary type of printing medium Z1 is added. After that, another arbitrary type of printing medium Zi can be added without using the specific type of printing medium X. However, when printing media for calibration are sequentially registered, various kinds of errors such as the reading variation of a reader unit A and conversion errors accumulate, and the calibration is supposed to have gradually lower accuracy. Hence, when two printing media equal in the above-described media approximate value exist, the printing medium registered earlier can have greater calibration accuracy compared to that registered later. Especially for an arbitrary type of printing medium added immediately after tonality control of the specific type of printing medium X, the error accumulation is assumed to be minimum.

In the media characteristic table according to the second embodiment shown in FIG. 17, data representing the creation order (generation) is added to the media characteristic table shown in FIG. 14. That is, the characteristic information includes information indicating the order of addition by the adding unit. Note that when calibration (tonality control) is performed again using the specific type of printing medium X, a CPU 301 may reset the creation order of each printing medium. That is, the CPU 301 gives a new creation order every time processing of adding a printing medium is performed. The CPU 301 thus functions as a reset unit which resets information indicating the order of an arbitrary type of printing medium added by the adding unit when a calibration performing unit executes calibration using a printing medium designated in advance.

Like the media approximate value of the first embodiment, the CPU 301 acquires the coefficients of the printing medium Zi from the media characteristic table (S1601 and S1602), and computes the media approximate value and difference (S1603 and S1604). Note that when computing the media approximate values, the creation order shown in FIG. 17 is taken into consideration. Note that in FIG. 17, the creation order and a coefficient corresponding to it are stored in association with each other. A table that associates the media type and the creation order is also separately stored in a memory 302. Note that when the order of registering each printing medium in a cell of the media type in FIG. 17 is linked to the creation order, the table that associates the media type with the creation order is unnecessary.

If the media type, grammage, gloss level, whiteness level, and creation order of each of the printing media Z1 and Z2 are assumed to be the coefficients shown in FIG. 18, the media approximate values and differences can be computed by Printing Medium Z1:

$$0+0.3+0+0.2+0.1=0.6$$

Printing Medium Z2:

$$0.3+0.4+0.3+0+0=1.0$$

When the differences of the printing media are compared, the printing medium Z1 is determined to be close to 0. Hence, the CPU 301 selects the printing medium Z1 as a medium suitable for tonality control. Note that the CPU 301 may display the differences of the printing media on the display device of an operation unit 313, and cause the operator who has referred to the differences to select the printing medium. This is because the operator does not always have all the registered printing media to hand. The difference of a printing medium would serve as a kind of recommendation information. Hence, allowing the operator to select a convenient printing medium by referring to the recommendation information of each printing medium improves the operator's convenience.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-216168, filed Sep. 17, 2009 which is hereby incorporated by reference herein in its entirety.

What is claimed is:

1. An image formation apparatus comprising:
   a correction unit configured to correct image data based on a tone correction condition;
   an image forming unit configured to form an image on a printing medium based on the image data corrected by the correction unit;
   an obtaining unit configured to obtain luminance data of a measurement image formed on the printing medium by the image forming unit;
   a generation unit configured to convert the luminance data obtained by the obtaining unit into density data based on conversion setting information corresponding to the printing medium and to generate the tone correction condition based on the density data;
   an adding unit configured to add conversion setting information corresponding to printing medium;
   a storage unit configured to store another conversion setting information and characteristic information of another printing medium corresponding to the conversion setting information added by the adding unit;
a determination unit configured to determine a target printing medium to be formed with the measurement image, based on the other characteristic information stored in the storage unit; and
a control unit configured to control the image forming unit to form the measurement image on the target printing medium determined by the determination unit, to control the generating unit to convert luminance data obtained by the obtaining unit from the measurement image formed on the target printing medium into density data based on target converting setting information corresponding to the target printing medium, and to control the generating unit to generate the tone correction condition based on the converted density data.

2. The apparatus according to claim 1, wherein the characteristic information includes at least one of information indicating a type of printing medium, information indicating a grammage, information indicating a gloss level, information indicating a whiteness level, and information indicating a rigidity level.

3. The apparatus according to claim 2, wherein the characteristic information includes information indicating an order of each arbitrary type of printing medium added by said adding unit.

4. The apparatus according to claim 1, wherein the determination unit is configured to determine the target printing medium by determining a printing medium of which characteristic information is most approximate to characteristic information of a predetermined printing medium among a plurality of other printing mediums different from the predetermined printing medium.

5. The apparatus according to claim 4, wherein said determination unit comprises:
a display unit configured to display a comparison result of the characteristic information for each of the plurality of other printing mediums including the most approximate arbitrary type of printing medium; and
an accepting unit configured to accept selection information of a selected printing medium input by an operator who refers to the comparison result,
wherein the determination unit is further configured to determine the target printing medium based on the selection information accepted by the accepting unit.

6. The apparatus according to claim 1, wherein determination unit comprises:
a summing unit configured to sum a plurality of characteristic coefficients of the characteristic information for each of the plurality of other printing mediums added by the adding unit, thereby computing a sum;
a difference unit configured to compute an absolute value of a difference between the sum and a value indicating the characteristics of a predetermined printing medium; and
a comparison unit configured to compare the absolute values of the differences of the plurality of arbitrary types of other printing mediums added by the adding unit.

7. An image formation apparatus comprising:
a correction unit configured to correct image data based on a correction condition;
an image forming unit configured to form an image on a printing medium based on the image data corrected by the correction unit;

an first obtaining unit configured to obtain read data by reading the measurement image formed on the printing medium by the image forming unit;
a converting unit configured to convert the read data obtained by the first obtaining unit into density data based on conversion condition corresponding the printing medium;
a generation unit configured to generate the correction condition based on the density data converted from the read data by the converting unit;
a storage unit configured to store specific conversion condition corresponding to a specific recording medium;
a creating unit configured to create another conversion condition corresponding to another printing medium based on read data of a measuring image formed on the specific printing medium, read data of a measuring image formed on the other printing medium different from the specific printing medium, and the specific conversion condition stored in the storage unit;
a second obtaining unit configured to obtain information indicating characteristic of other printing medium; and
a determination unit configured to determine a printing medium to be formed with the measurement image based on the information indicating the characteristic of the other printing medium in case where the creating unit creates a plurality of the other converting condition.

8. The apparatus according to claim 7, wherein the characteristic is a type of the other printing medium.

9. The apparatus according to claim 7, wherein the characteristic is grammage of the other printing medium.

10. The apparatus according to claim 7, wherein the characteristic is glossiness of the other printing medium.

11. The apparatus according to claim 7, wherein the characteristic is whiteness of the other printing medium.

12. The apparatus according to claim 7, wherein the determination unit includes a comparison unit configured to compare the information of the other printing mediums, and further configured to determine the printing medium to be formed with the measurement image based on comparison result of the comparison unit.

13. The apparatus according to claim 12, wherein the comparison unit is further configured to compute characteristic value of the other printing mediums based on the information obtained by the second obtaining unit, and
wherein the determination unit is further configured to determine the printing medium to be formed with the measurement image based on a printing medium of which characteristic value is most approximate to characteristic value of the specific printing medium.

14. The apparatus according to claim 12, wherein the determination unit comprises:
a display unit configured to display the comparison result of the comparison unit; and
a selection unit configured to select the printing medium to be formed with the measurement image among the other printing mediums,
wherein the determination unit is further configured to determine the printing medium to be formed with the measurement image based on a selection result of the selection unit after the display unit displays the comparison result of the comparison unit.

* * * * *